(12) United States Patent
Kim et al.

(10) Patent No.: US 6,640,024 B1
(45) Date of Patent: Oct. 28, 2003

(54) ADD-DROP WAVELENGTH FILTER USING MODE DISCRIMINATION COUPLERS AND TILTED BRAGG GRATINGS

(75) Inventors: Byoung Yoon Kim, Taejon (KR); Hee Su Park, Seoul (KR); Seok Hyun Yun, Taejon (KR)

(73) Assignee: Korea Advanced Institue of Science & Technology, Taejon (KR)

( * ) Notice: Subject to any disclaimer, the term of this patent is extended or adjusted under 35 U.S.C. 154(b) by 0 days.

(21) Appl. No.: 09/700,245

(22) PCT Filed: Feb. 22, 2000

(86) PCT No.: PCT/KR00/00138

§ 371 (c)(1),
(2), (4) Date: Nov. 9, 2000

(30) Foreign Application Priority Data

Mar. 10, 1999 (KR) ............................................. 99-7847

(51) Int. Cl.[7] ................................................. G02B 6/28
(52) U.S. Cl. ........................... 385/24; 385/37; 385/28
(58) Field of Search .............................. 385/37, 24, 28

(56) References Cited

U.S. PATENT DOCUMENTS

| | | | |
|---|---|---|---|
| 5,574,807 A | 11/1996 | Snitzer | 385/24 |
| 5,740,292 A * | 4/1998 | Strasser | 372/6 |
| 5,805,751 A | 9/1998 | Kewitsch et al. | 385/43 |
| 5,848,204 A * | 12/1998 | Wanser | 385/12 |

FOREIGN PATENT DOCUMENTS

| | | | |
|---|---|---|---|
| JP | 3263003 | 11/1991 | G02B/6/00 |
| JP | 7174928 | 7/1995 | G02B/6/122 |

* cited by examiner

*Primary Examiner*—Robert H. Kim
*Assistant Examiner*—George Y. Wang
(74) *Attorney, Agent, or Firm*—Kenta Suzue; Wilson Sonsini Goodrich & Rosati

(57) ABSTRACT

An add-drop wavelength filter is described which separates specific wavelength components from optical signals propagating through an optical waveguide or adds specific wavelength components thereto. In general, add-drop wavelength filters serve to separate or add specific channels in channels comprising several different wavelengths in a wavelength division optical communication system, and require good wavelength selectivity, stability and etc. Up to now, several types of add-drop wavelength filters are proposed, however disadvantageously they were not stable or were difficult to fabricate. The add-drop wavelength filter of the present invention comprising a mode discrimination coupler, Bragg gratings in which mode conversion occurs and etc., utilizes mode conversion in a dual mode waveguide and has low loss and stability. Furthermore, devices included in the add-drop wavelength filter are conventionally used, thereby resulting in easy fabrication, and the application fields of the devices can be easily expanded by apodization, chirping, or etc. of the Bragg gratings.

11 Claims, 7 Drawing Sheets

ADD-DROP WAVELENGTH FILTER USING MODE DISCRIMINATION COUPLERS AND TILTED BRAGG GRATINGS

This application is the National Stage of International Application No. PCT/KR00/00138, filed Feb. 22, 2000, which is incorporated herein by reference in its entirety.

TECHNICAL FIELD

The present invention relates to an apparatus for measuring stress, and more particularly to a fiber-optic add-drop wavelength filter which drops specific channels or adds specific channels in a wavelength division optical communication system while having low insertion loss.

BACKGROUND ART

In general, a passive device is required which may drop or add channels at any points in line in order to realize a wavelength division optical communication system. In particular, an element is required which can select narrow wavelength range less than 1 nm while having low insertion loss in order to increase the number of channels. In an optical fiber, fiber-optic Bragg gratings have a characteristic of a good wavelength selectivity and low loss like this.

The simplest fiber-optic add-drop wavelength filter is made by combining fiber-opticr Bragg gratings and a fiber-optic directional coupler. In the fiber-optic add-drop wavelength filter, output optical signals are obtained by inputting optical signals to a port of the fiber-optic directional coupler, reflecting output optical signals therefrom at the fiber-optic Bragg gratings, and then causing the signals to pass through the fiber-optic directional coupler again. This type of add-drop wavelength filter may be very simply manufactured but has a disadvantage of always giving an insertion loss of at least 6 dB. To overcome this, for instance, a non-reciprocal optical circulator is connected to optical Bragg gratings so that input optical signals, after being reflected on the Bragg gratings via the optical circulator, are output through a remaining port through which the optical signals did not proceed in an optical circulator. Although advantageously this is very stable and has small amount of reflection loss and interference between channels, this has disadvantages that there exists a certain insertion loss, an expansion to an integrated optical device is impossible, and the cost is high because this is not an all-fiber device. Therefore, an add-drop wavelength filter is required which is an all-fiber structure while having low loss, and several types of all-fiber add-drop wavelength filters have been proposed.

FIGS. 1A to 1C show functions of structural parts of general add-drop wavelength filters. FIG. 1A shows the function of a wavelength dropping device 10, FIG. 1B shows the function of a wavelength adding device 10', and FIG. 1C shows the function of an add-drop wavelength filter 10". Referring to FIG. 1A, when optical signals 60 comprising of multi-wavelengths including a wavelength $\lambda_i$ are introduced to an input port 20 of the wavelength dropping device, signals of the specific wavelength $\lambda_i$ propagate to a drop port 40 and the remaining signals excluding the wavelength $\lambda_1$ propagate to an output port 30. Referring to FIG. 1B, signals 90 excluding the specific wavelength $\lambda_i$ are introduced into an input port 20', added to the signals 110 of $\lambda_i$ introduced to an add port 50', and then the added signals 100 propagate to an output port 30'. Referring to FIG. 1C, when optical signals 120 are introduced into an add-drop wavelength filter 10" through an input port 20", signals 140 of $\lambda_i$ in the optical signals are separated to propagate to a drop port 40", and the remaining signals with the signals of $\lambda_i$ being separated are joined with new signals 150 of $\lambda_i$ to propagate to an output port 30" as new signals 130.

Several configurations of conventional add-drop wavelength filters performing functions like these are illustrated as follows:

FIG. 2 shows a configuration of an add-drop wavelength filter in which Bragg gratings 220 and 222 are written respectively within both arms of a Mach-Zehnder interferometer 205 comprising two optical couplers 210 and 212. When input optical signals are introduced into an input port I, the signals which are separated after the reflection by the Bragg gratings are output through a drop port D, the remaining output signals propagate to an output port D, and optical signals to be added are input into an add port A. An add-drop wavelength filter of this type has a low insertion loss and an excellent wavelength selectivity however requires accurate finish processes about the length or the refractive index of the optical fiber in manufacturing. Furthermore, even after completion, the filter is sensitive to external temperature variation and thus has a poor stability in operation.

FIG. 3 shows a configuration of an add-drop wavelength filter of the type which combines a fiber-optic polarization splitter 230, polarization controllers 240 and 242, and fiber-optic Bragg gratings 250 and 252. FIG. 4 to FIG. 6 show configurations of fiber-optic add-drop wavelength filters of the type in which a fiber-optic Bragg grating 270 is written within a fiber-optic directional coupler 260. Herein, same components are represented as same reference numerals. As described above, although the way using a polarization divider or using a directional coupler, within which a Bragg grating is written, is relatively more stable than an interferometer type, each components should be controlled very accurately in order to attain desired wavelength characteristics and it is difficult to obtain good wavelength characteristics.

Besides, as illustrated in FIG. 7, an add-drop wavelength filter was also presented, in which a titled Bragg grating 310 is written within a fused-type fiber-optic directional coupler 300 which is made with two different optical fibers 280 and 290. In turn, as illustrated in FIG. 8, an add-drop wavelength filter was also presented which was made by using a dual core optical fiber 320, directional couplers 330 and 332, and a Bragg grating 350 which is written within only one core 340 of the dual core optical fiber. But in these cases, they are disadvantageously difficult to manufacture because the used fiber-optic devices can not be made or gained easily.

Furthermore, recently, an add-drop wavelength filter using two different dual mode optical waveguides 360 and 370, mode discriminating directional couplers 380 and 382 and titled Bragg gratings 390, 392 and 394 was proposed by Strasser et al, as shown in FIG. 9. This add-drop wavelength filter has a low loss and is stable in general, but includes several things difficult to be realized in practice. In order to make a mode discriminating directional coupler which is used in the proposed add-drop wavelength filter, two different dual mode optical fibers or dual mode optical waveguides are required in which effective refractive indexes of LP11 mode are same each other with an accuracy of at most 0.0001 and effective refractive indexes of LP01 modes are different from each other, which are difficult to manufacture. Furthermore, two Bragg gratings having same reflective spectra and same mode conversion features are required to be written within two different waveguides respectively, which is also difficult to be realized because a very high accuracy is demanded.

Therefore, in the prior art, it is hard to recognize that the optimum fiber-optic add-drop wavelength filter for a wavelength division optical communication system exists which is easy to manufacture and has low insertion loss and good stability, and therefore there exist difficulties to select a suitable fiber-optic add-drop wavelength filter according to situations.

DISCLOSURE OF INVENTION

Accordingly, it is an object of the present invention to provide an all-fiber add-drop wavelength filter which may be easily manufactured while having excellent wavelength selectivity, good stability, and low insertion loss.

The fiber-optic add-drop wavelength filter of the present invention to achieve the above mentioned object basically serves to separate optical signals having at least one wavelength $\lambda_i$ ($1 \leq i \leq n$) from input optical signals consisting of multiple wavelengths of $\lambda_i, \ldots,$ and $\lambda_n$ (n is a positive integer more than 1) or serves to add optical signals having at least one wavelength $\lambda_j$ to the input optical signals. In the optical add-drop wavelength filter of the present invention, input of the multiple wavelength optical signals and output of the optical signals which experienced wavelength add/drop are performed in a mutually exchanging manner by the first optical waveguide and the first dual mode optical waveguide. Herein, the first optical waveguide can propagate higher-order modes as well as a fundamental mode therein. Furthermore, the first optical waveguide and the first dual mode optical waveguide are coupled with a mode discriminating directional coupler thereby causing an energy transfer between the fundamental mode of the first optical waveguide and the higher-order mode of the dual mode optical waveguide to occur with at least 50% efficiency and also the fundamental mode of the dual mode optical waveguide to propagate without change. In addition, the second dual mode optical waveguide for propagating optical signals which passed through the mode discriminating directional coupler therein is connected to the first dual mode optical waveguide. Furthermore, an arrangement of Bragg gratings is written within the second dual mode optical waveguide, in which at least one Bragg grating is connected in series which is tilted with an angle of more than 0.1 degree with respect to a plane perpendicular to the propagation direction of the optical signals. The Bragg grating serves to perform both mode conversion and reflection of the optical signals propagating within the second dual mode optical waveguide at drop wavelength $\lambda_i$ and add wavelength $\lambda_j$.

In the present invention, an optical fiber or an integrated optics waveguide may be used as the first optical waveguide and the first and second dual mode optical waveguides. It is also preferred that the first and second dual mode optical waveguides are provided integrally without any connecting portions. When the first optical waveguide and the first and second dual mode optical waveguides are comprised of optical fibers, the fundamental mode of the first optical waveguide and the higher-order mode of the dual mode optical waveguides have same propagation constant, and more preferably the mode discriminating directional coupler is a fiber-optic directional coupler which utilizes the coupling of evanescent electric field. For the mode discriminating directional coupler, any of a polished-type directional coupler or a fused-type directional coupler may be used. In the mode discriminating directional coupler, a pair of a dual mode optical fiber and a single mode optical fiber is preferably selected which have propagation constants corresponding to each other suitably, so that an energy transfer occurs with at least 99% efficiency between LP01 mode of the single mode optical fiber and LP11 mode of the dual mode optical fiber, in which LP01 mode of the dual mode optical fiber never undergoes any energy transfer. In the mode discriminating directional coupler, the direction of the surface where the dual mode optical fiber and the single mode optical fiber contact together is preferably aligned with a plane perpendicular to the lobe direction of LP11 mode which propagates through the dual mode optical fiber, and the lobe direction of LP11 mode in the dual mode optical fiber is preferably determined along one of birefringence axes.

In the dual mode optical waveguide of the add-drop wavelength filter, LP01 mode is preferably used as the fundamental mode, and LP11 mode is perferably used as the higher-order mode, respectively. Furthermore, when using a dual mode optical fiber as the dual mode optical waveguide, the dual mode optical fiber preferably has linear birefringence so that the intensity distribution direction of the mode does not change in respect to the optical fiber while propagating in the optical fiber, Although a dual mode optical fiber having small birefringence may be used, in this case a polarization controller which can adjust the amount of the birefringence is preferably used together. In addition, the dual mode optical waveguide is preferably selected as an elliptic core optical fiber so that the energy distribution of the higher-order mode in the dual mode optical waveguide does not change as the optical signals propagate.

In the mean time, when the tilted Bragg grating is formed, the tilted direction of the Bragg grating is preferably selected to be the lobe direction of LP11 mode determined in the mode discriminating directional coupler; and is more preferably selected to be one of either an angle in which the fundamental mode to the fundamental mode reflection does not happen in the dual mode optical waveguide or an angle in which the higher-order mode to the higher-order mode reflection does not happen in the dual mode optical waveguide. When using an optical fiber as the optical waveguide, input is in the direction of the dual mode optical fiber of the mode discriminating directional coupler and output of the selected wavelength is in the direction of the single mode optical filter in case that the reflection between LP01 modes disappears, and vice versa in case that the reflection between LP11 modes disappears. The half power width of the reflection wavelength of the fiber-optic Bragg gratings is preferably less than 1 nm, and the reflectivity thereof is preferably more than 99%.

Furthermore, the add-drop wavelength filter may further comprise a mode converter which performs mode conversion between the fundamental mode and higher-order mode of said dual mode optical waveguides, and additionally a single mode optical waveguide may be connected in series to at least one of the first and second dual mode optical waveguides. In addition, an optical amplifier for amplifying for amplifying input/output optical signals may be preferably connected in series to at least one of the single mode optical waveguide and the first dual mode optical waveguide.

The method carrying out a wavelength add/drop by using the add-drop wavelength filter is as follows: First, when input optical signals are introduced into the the tilted Bragg gratings via the mode discriminating directional coupler, the tilted Bragg gratings reflect optical signals having a specific wavelength range while converting the mode of the optical signals. The reflected optical signals propagate through a port of the mode discriminating directional coupler which is different from the port where optical signals were input. This is same when performing add/drop of specific channels in respect to the optical signals, in which two of the mode discriminating directional couplers may be respectively connected to both sides of the Bragg grating thereby serving to add and drop channel signals.

When input optical signals are introduced into the mode discriminating directional coupler via the first optical waveguide, the entire signals propagate as converted into LP11 mode of the dual mode optical waveguide, and the signals are reflected at a specific wavelength which satisfies phase matching conditions while passing through the tilted Bragg gratings. These reflected signals are converted into LP01 mode and are output in the direction of the dual mode optical waveguide without undergoing any energy transfer in the mode discriminating directional coupler. On the contrary, when the input optical signals are introduced into the mode discriminating directional coupler as LP01 mode via the dual mode optical waveguide, the input optical signals propagate into the Bragg grating without undergoing any energy transfer and are reflected as converted into LP11 mode at the wavelength which satisfies phase matching conditions. These reflected optical signals are output to the first optical waveguide in the mode discriminating directional coupler. While passing through a second mode discriminating directional coupler, remaining optical signals which do not satisfy phase matching conditions are output through the first optical waveguide in case the input optical signals are introduced in the first optical waveguide and through the dual mode optical waveguide in case the input optical signals are introduced in the dual mode optical waveguide, respectively. In the dual mode optical waveguide within which a Bragg grating is written, a mode converter may be added at the opposite side with the reference of the Bragg grating from the position where the mode discriminating directional coupler is connected. Herein, the mode converter is a device which converts the fundamental mode signals into the higher-order mode signals which propagate through the dual mode optical waveguide. In the above mentioned case, when the input port is in the first optical waveguide direction, the remaining optical signals which do not satisfy phase matching conditions pass through the mode converter and propagate as converted into the fundamental mode of the dual mode optical waveguide. The configuration like this illustrates an apparatus for only separating wavelength. If the input optical signals are introduced into the mode converter as a fundamental mode, the optical signals which were converted into the higher-order mode pass through the Bragg grating and are output through the first optical waveguide by the mode discriminating directional coupler. At this time, if optical signals which satisfy phase matching conditions are introduced in the direction of the dual mode optical waveguide of the mode discriminating directional coupler, they are eventually output through the first optical waveguide. This corresponds to a wavelength adding apparatus. In summarizing, an add/drop wavelength filter may be constructed by combining a mode discriminating directional coupler, Bragg gratings and a mode converter.

BEST MODE FOR CARRYING OUT THE INVENTION

Figure 1A:
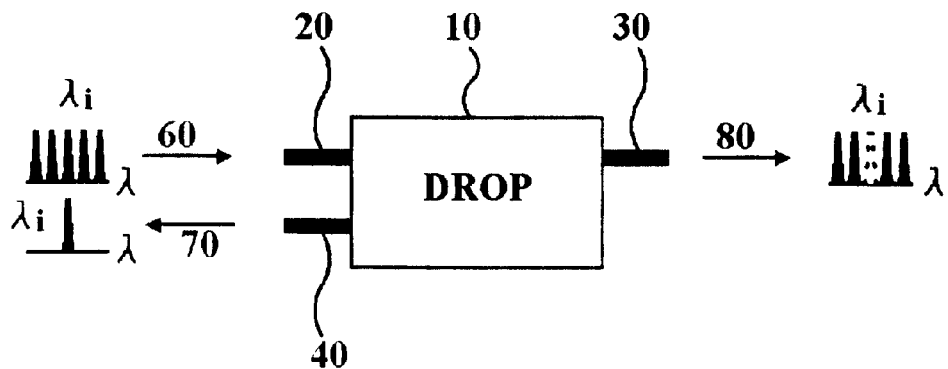
FIGS. 1A to 1C show functions of structural parts of general add-drop wavelength filters.
Figure 1B:
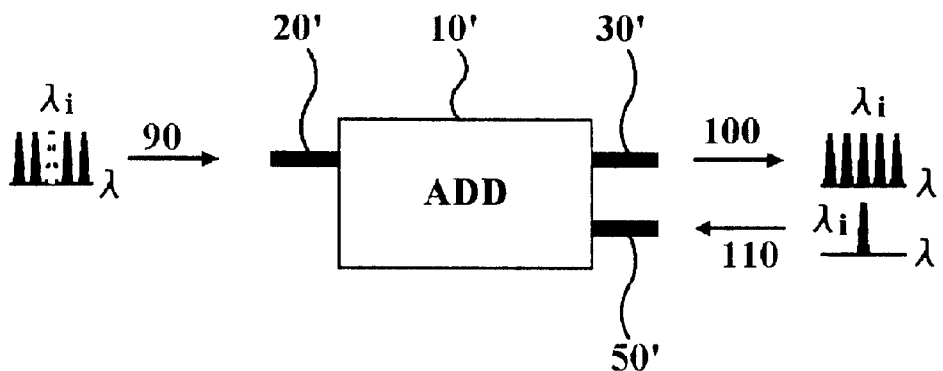
Figure 1C:
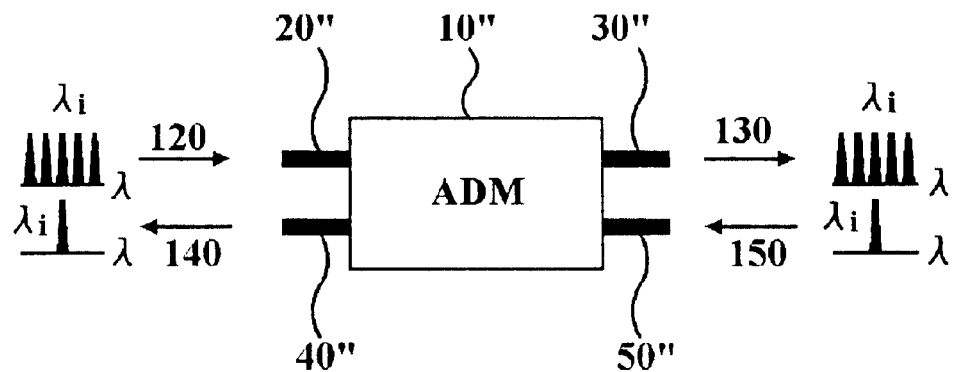
Figure 2:
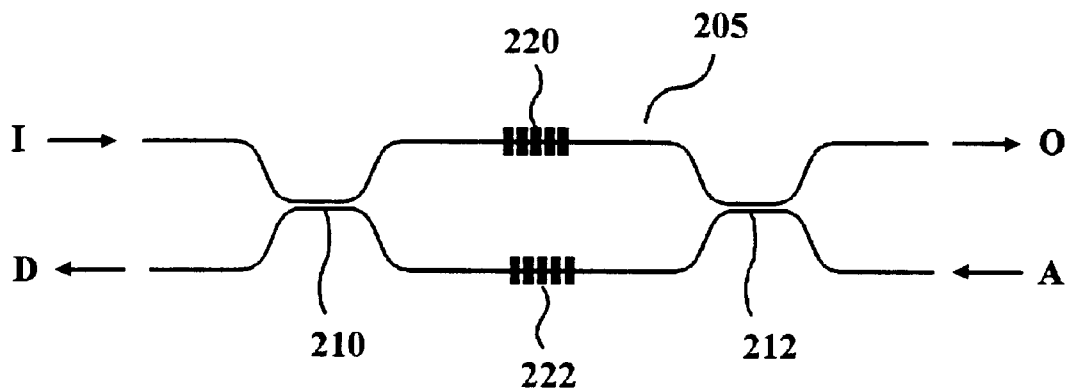
FIG. 2 shows the configuration of a conventional add-drop wavelength filter comprising a March-Zhender interferometer and Bragg gratings.
Figure 3:
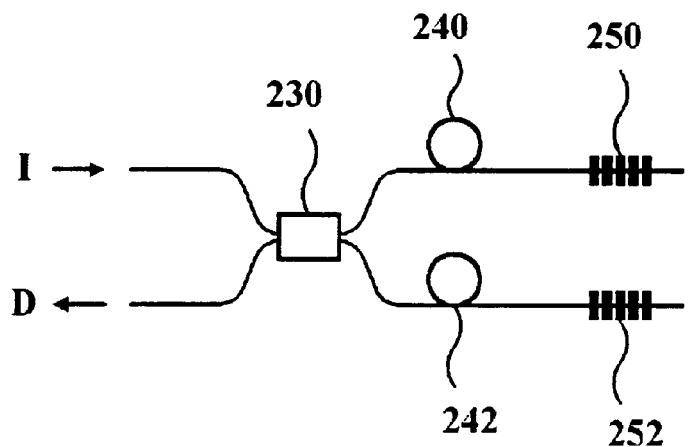
FIG. 3 shows the configuration of another conventional add-drop wavelength filter using a fiber-optic polarization splitter, polarization controllers and Bragg gratings.
Figure 4:
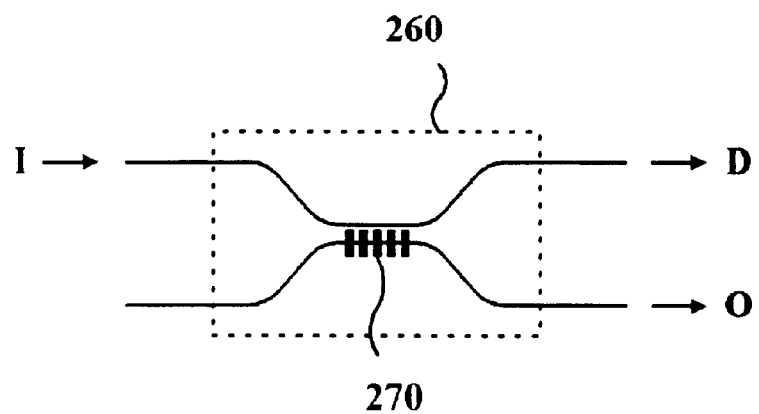
FIG. 4 shows the configuration of a conventional add-drop wavelength filter in which a Bragg grating is written within a fiber-optic directional coupler.
Figure 5:
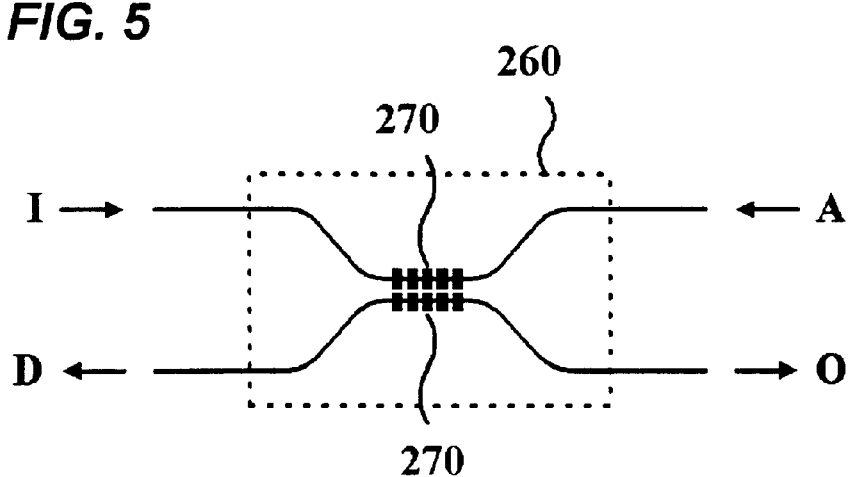
FIG. 5 shows the configuration of other conventional add-drop wavelength filter in which a Bragg grating is written within a fiber-optic directional coupler.
Figure 6:
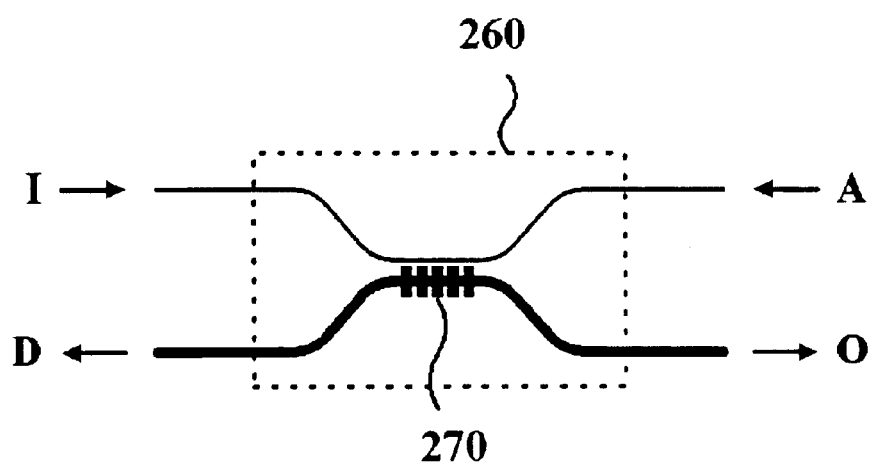
FIG. 6 shows the configuration of another conventional add-drop wavelength filter in which a Bragg grating is written within a fiber-optic directional coupler.
Figure 7:
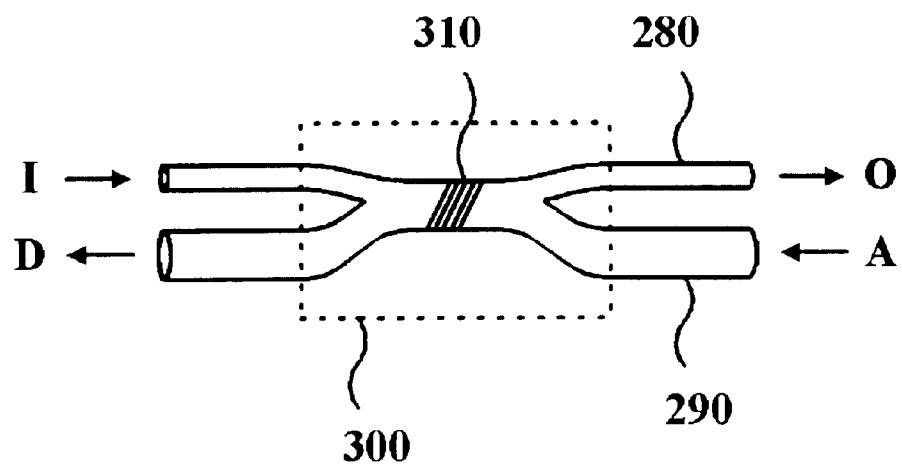
FIG. 7 shows the configuration of another conventional add-drop wavelength filter fabricated by writing a tilted Bragg orating within a fused-type directional coupler.
Figure 8:
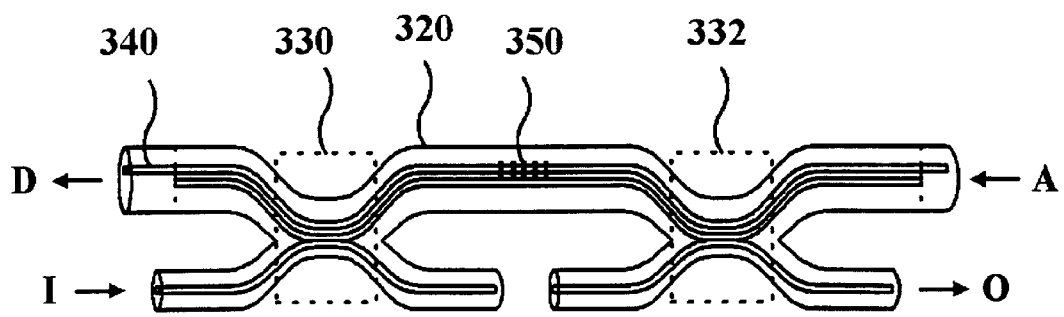
FIG. 8 shows the configuration of a conventional add-drop wavelength filter using a dual core optical fiber, fiber-optic directional couplers and a Bragg grating.
Figure 9:
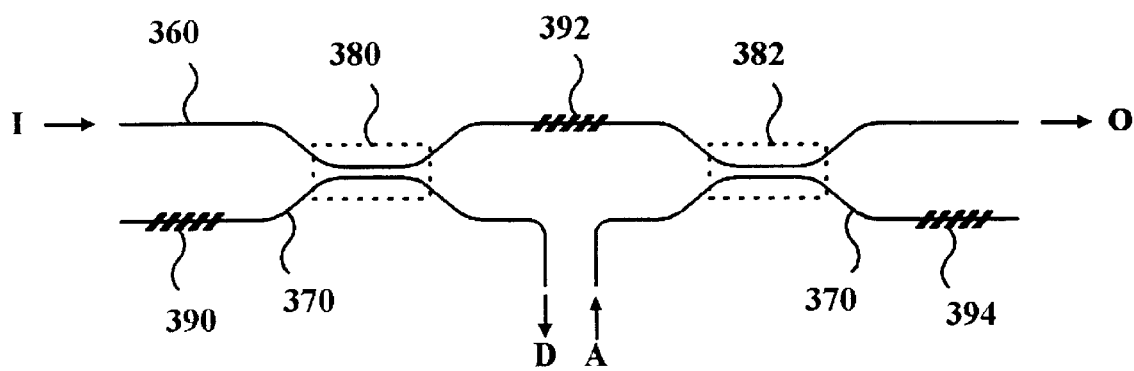
FIG. 9 shows the configuration of a conventional add-drop wavelength filter using two dual mode optical waveguides, mode discriminating directional couplers and tilted Bragg gratings.
Figure 10A:
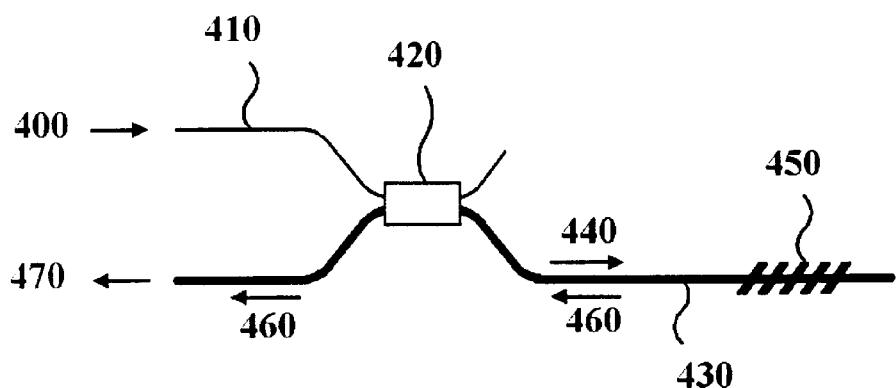
FIGS. 10A and 10B show the configuration of an add-drop wavelength filter according to one embodiment of the present invention, and the propagation direction of optical signals thereof.

FIG. 10A shows the configuration of a fiber-optic add-drop wavelength filter according to an embodiment of the present invention. When optical signals 400 of a wavelength satisfying phase matching conditions of a Bragg grating used in this embodiment is introduced into a mode discriminating directional coupler 420 through a single mode optical fiber 410, all the signals propagate as converted into LP11 mode 440 of a dual mode optical fiber 430. A part of these signals 470 are reflected and converted into LP01 mode 460 while passing a titled fiber-optic Bragg grating 450. These optical signals 470 are output along the dual mode optical fiber 430 at an output port of the mode discriminating directional coupler 420, without undergoing any energy transfer at the mode discriminating directional coupler 420. According to the concept of the present invention, as an optical fiber 410 into which optical signals 400 are introduced, it is not required to use an optical fiber which propagates only fundamental mode, but an optical fiber can be also selected which propagate other modes including the fundamental mode. However, in this embodiment a single mode optical fiber was used for the sake of convenience.

Figure 10B:
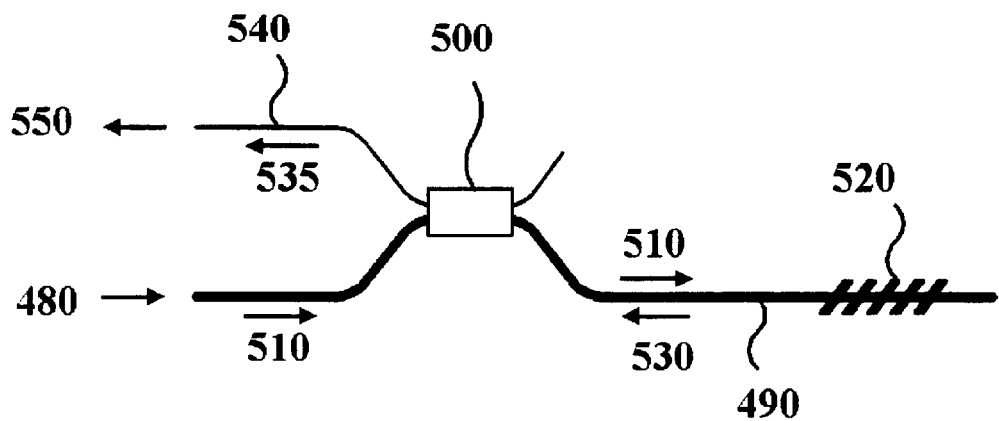

FIG. 10B illustrates an optical signal path in case that a wavelength signals 480 are introduced into a mode discriminating coupler 500 through a dual mode optical fiber 490 in the fiber-optic add-drop wavelength filter shown in FIG. 10A. After a part of signals of LP01 mode 510 are reflected as converted into LP11 mode 530 at a Bragg grating 520, they are converted into LP01 mode 535 in the mode discriminating directional coupler 500, then optical signals 550 are output in the direction of a single mode optical fiber 540 which corresponds to an output port of the mode discriminating directional coupler 500.

Figure 11A:
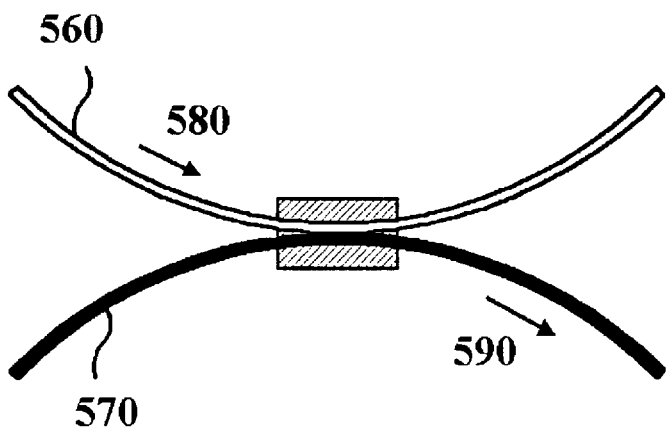
FIGS. 11A and 11B show configurations of mode discriminating directional couplers used in embodiments of the present invention.
Figure 11B:
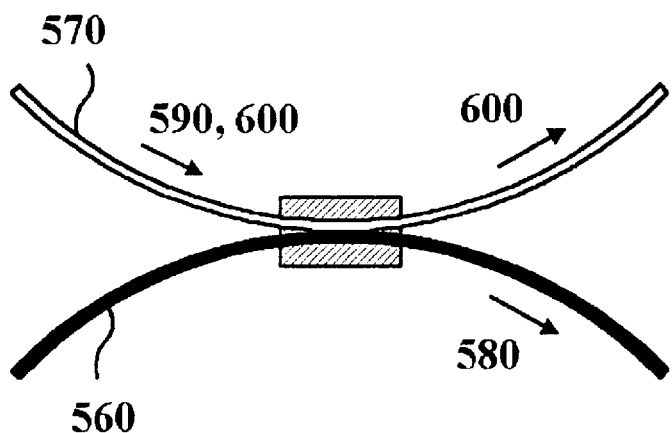

FIGS. 11A and 11B show outputs when optical signals are input into the single mode optical fiber and the dual mode optical fiber in the mode discriminating directional coupler which is used respectively in the fiber-optic add-drop wavelength filters shown in FIGS. 10A and 10B. The single mode optical fiber 560 used in this embodiment is a conventional communication-grade single mode optical fiber with the cladding diameter of 125 $\mu$m, and the dual mode optical fiber 570 is an elliptic core optical fiber having a refractive index difference between the core and the cladding of 0.4%, a cladding diameter of 96 $\mu$m, and a core diameter of 8×13 $\mu$m. These optical fibers are selected so that LP01 mode 580 of the single mode optical fiber and LP11 mode 590 of the dual mode optical fiber have same propagation constant around 1550 nm, thus an energy transfer occurs only between these modes, and LP01 mode 600 of the dual mode optical fiber never undergoes an energy transfer with the mode of the single mode optical fiber due to the difference of the propagation constants between them. The mode discriminating directional coupler was made by polishing the claddings of the single mode optical fiber and the dual mode optical fiber, and then fixing cores of two optical fibers adjacent.

Figure 12:
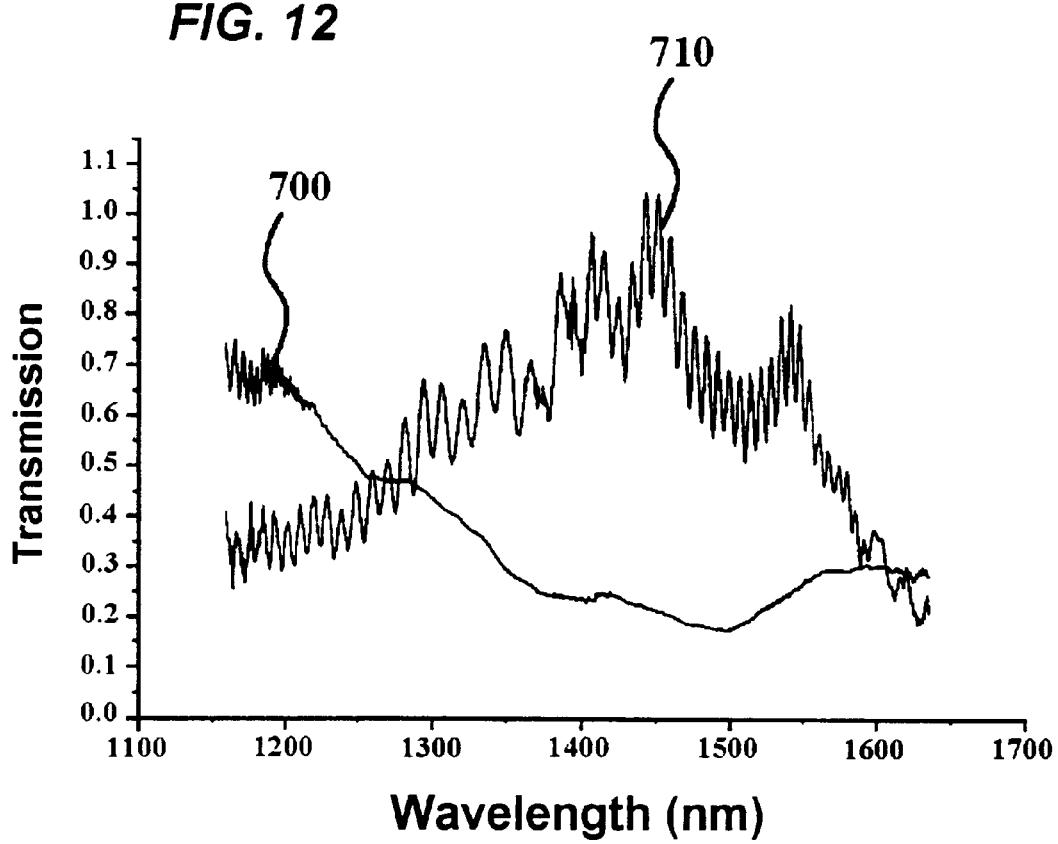
FIG. 12 is a graph showing the output spectrum when optical signals are introduced into the mode discrimination directional coupler shown in FIG. 11A.

FIG. 12 is a graph showing a spectrum 700 of a signal output through the single mode optical fiber and a spectrum 710 of a signal output through the dual mode optical fiber together, when optical signals are introduced in the direction of the single mode optical fiber 560 of the mode discriminating directional coupler shown in FIG. 11A. In a manufactured polished-type mode discriminating directional coupler, the degree of energy transfer can be adjusted, and in this case it is adjusted so that the maximum energy transfer between optical fibers occurs at 1550 nm. The full-width-half-maximum of the wavelength range where the energy transfer occurs is at least 200 nm. The fluctuation shown in output features of the dual mode optical fiber is appeared by the interference in a detector between LP11 mode optical signals and small amount of LP01 mode optical signal of the dual mode optical fiber.

Figure 13:
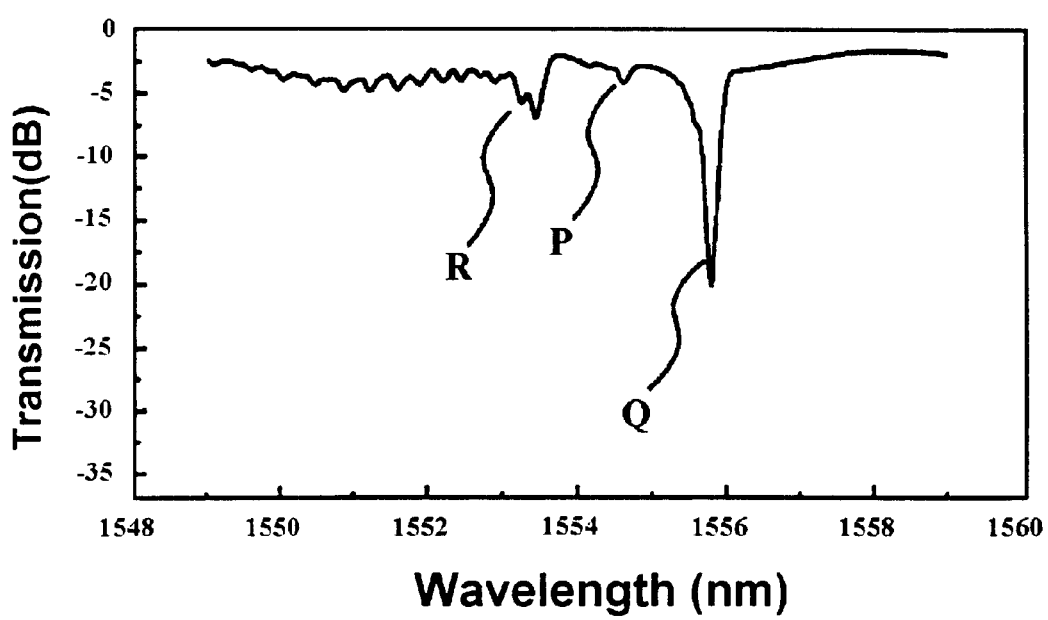
FIG. 13 is a graph showing a transmission spectrum of the tilted fiber-optic Bragg grating used in one embodiment of the present invention.

FIG. 13 is a graph showing an output spectrum when the optical signals of LP11 mode were introduced into the titled fiber-optic Bragg grating used in one embodiment of the present invention. The fiber-optic Bragg grating was titled from the plane perpendicular to the length of the optical fiber with an angle of 2.0 degree. A peak P appearing at 1554.6 nm corresponds to a wavelength at which LP11 mode reflects into LP11 mode and a peak Q appearing at 1555.8 nm corresponds to a wavelength at which LP11 mode reflects into LP01 mode. Wavelength components which are separated or added in the fiber-optic add-drop wavelength filter are wavelengths at which LP11 mode reflects into LP01 mode. In the dual mode optical fiber used in the present invention, the titled angle of the Bragg grating was selected as 2.0 degree to prevent LP11 mode from reflecting to LP11 mode. Referring to FIG. 13, it can be recognized that the reflectivity at which LP11 mode reflects into LP11 mode is very small compared to the reflectivity of the wavelength component in which wavelength add/drop occurs. In FIG. 13, several peaks R appearing in the wavelength range of less than 1553.5 nm correspond to the reflection of LP11 mode signals into several cladding mode signals. These peaks are preferred to be small since they produce optical loss, which can be decreased by using for example "a depressed cladding fiber" the refractive index distribution of which is adjusted properly. Futhermore, the wavelength at which this loss peak R occurs can be separated away from the wavelength at which the wavelength add/drop occurs by using an optical fiber in which the refractive index difference between the core and cladding is large.

Figure 14:
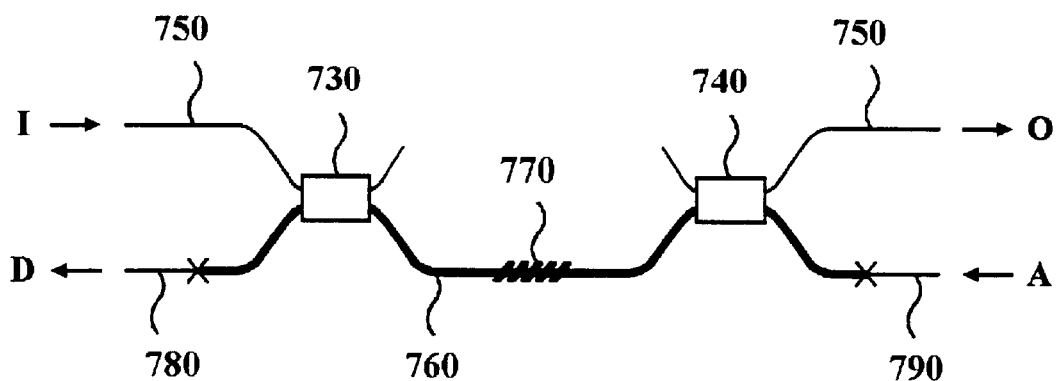
FIG. 14 shows the configuration of a fiber-optic add-drop wavelength filter according to another embodiment of the present invention which is made to carry out separation and addition of signals simultaneously.

FIG. 14 shows the configuration of a fiber-optic add-drop wavelength filter according to another embodiment of the present invention which is made to carry out separation and addition of signals simultaneously. Referring to FIG. 14, the add-drop wavelength filter comprises two mode discriminating directional coupler 730 and 740, single and dual mode optical fibers 750 and 760 constituting thereof, a titled fiber-optic Bragg grating 770, and single mode optical fibers 780 and 790 connected to the dual mode optical fiber. The dual mode optical fiber 760 and the single mode optical fibers 780 and 790 are connected with their core centers aligned in a line so that only LP01 mode of the two optical fibers can pass. A mode stripper using bending loss may be further provided to the dual mode optical fiber in the connecting portion. The principle of the wavelength add/drop is same as shown in FIGS. 10A and 10B, and in particular the add-drop wavelength filter shown in FIG. 14 comprises two mode discriminating directional couplers thereby serving to separate one wavelength component from the optical signals and simultaneously to add the signals having same wavelength as that of the signals separated to the optical signals. The input optical signals are input to a port I, and the signals dropped by the add-drop wavelength filter are output from a port D, The remaining optical signals propagate into a port O, and when adding optical signals having same wavelength as that of the dropped optical signals, they are input to a port A.

Figure 15:
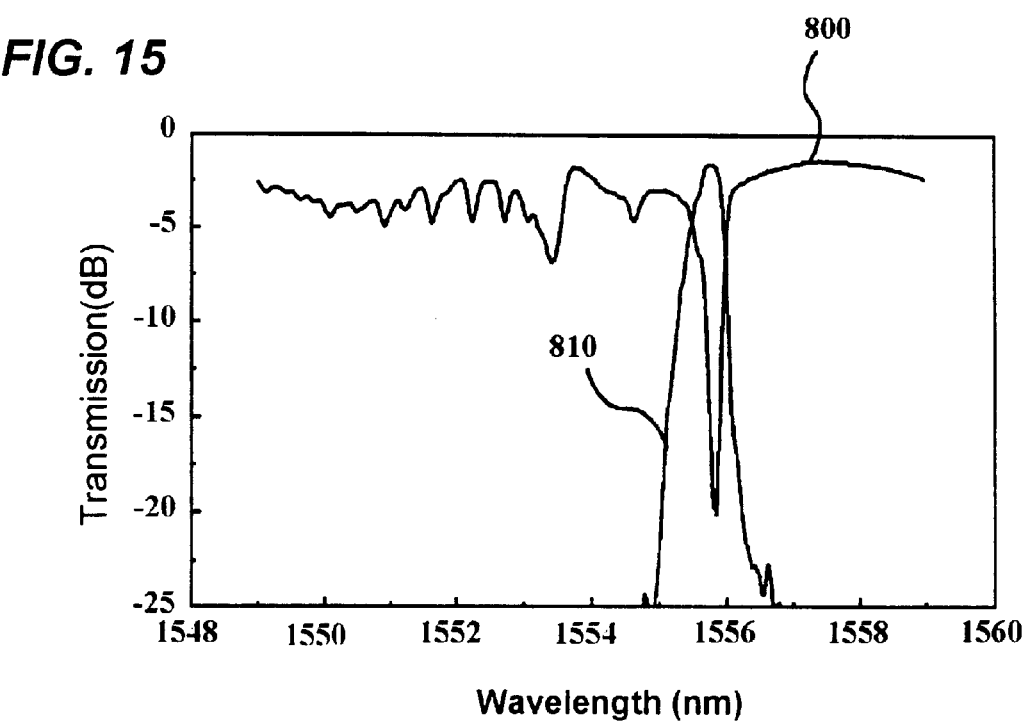
FIG. 15 is a graph showing the spectra of transmission signals and separation signals respectively when optical signals having broad linewidth are introduced into the add-drop wavelength filter shown in FIG. 14.

FIG. 15 is a graph showing the spectra 800 and 810 of transmission signals and separation signals respectively when optical signals having broad linewidth are introduced into the fiber-optic add-drop wavelength filter shown in FIG. 14. Referring to FIG. 15, it can be seen that the wavelength range having a central wavelength of 1555.8 nm and a full-width-half-maximum of 0.5 nm was separated. The loss at the separated central wavelength was 1.5 dB and the loss carried with the remaining transmission signal was about 1.5 dB.

Figure 16:
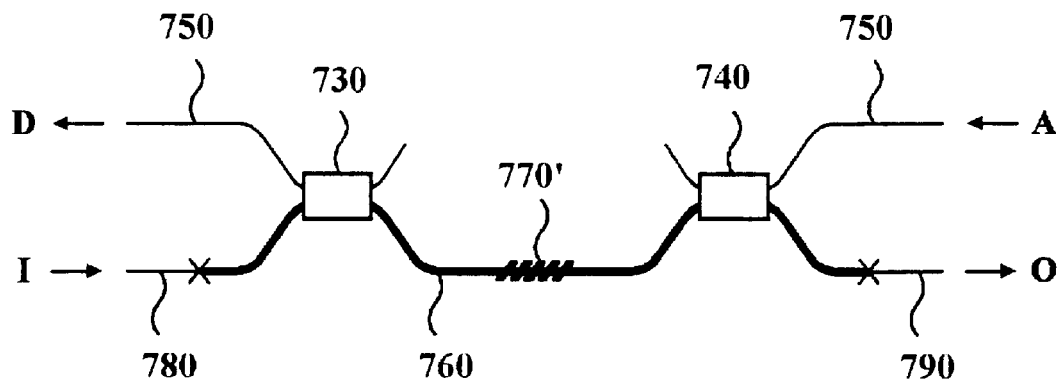
FIG. 16 shows the propagating paths of the optical signals when input optical signals are introduced into a dual mode optical fiber in the add-drop wavelength filter shown in FIG. 14.

FIG. 16 shows the propagating paths of the optical signals (drop signals, transmission signals, and add signals) when input optical signals are introduced into a dual mode optical fiber in the add-drop wavelength filter shown in FIG. 14. In the configuration as of FIG. 16, it is preferable to select the titled angle of the Bragg grating 770' with an angle at which the reflection between LP01 modes of the optical fiber is inhibited.

INDUSTRIAL APPLICABILITY

The above mentioned fiber-optic add-drop wavelength filter of the present invention may be applied as a device which may drop or add channels on the transmission line of the wavelength division optical communication system. It may also be applied to the optical communication device and the optical sensor since it is an optical filter comprising commonly used elements and has low loss and good stability.

Although the present invention has been described with respect to preferred embodiments, it is obvious for those skilled in the art that equivalent alterations and modifications should fall within the scope of the present invention. The scope of the present invention will be limited only by the expressions of the appended claims.

What is claimed is:

1. An optical signal add-drop wavelength filter for separating optical signals having at least one wavelength $\lambda_i(1 \leq i \leq n)$ from input optical signals consisting of multiple wavelengths of $\lambda_i, \ldots,$ and $\lambda_n$ (n is a positive integer more than 1) or adding optical signals having at least one wavelength $\lambda_j$ to said input optical signals, said wavelength filter comprising:

a dual mode optical waveguide and a first optical waveguide in which input of the multiple wavelength optical signals and output of optical signals which experienced wavelength add-drop are performed in a mutually exchanging manner;

a mode discriminating directional coupler formed with a first portion of the dual mode optical waveguide and a portion of the first optical waveguide, the mode discriminating directional coupler characterized by energy transfer of at least 50% between a fundamental mode of said first optical waveguide and a higher-order mode of said dual mode optical waveguide and also by enabling the fundamental mode of said dual mode optical waveguide to propagate without change, in said input optical signal range; and a second portion of the dual mode optical waveguide for transmitting optical signals to and from said mode discriminating directional coupler and an arrangement of Bragg gratings, wherein the arrangement of Bragg gratings is written within said second portion of the dual mode optical waveguide, and at least one Bragg grating in the arrangement of Bragg gratings is connected in series and tilted with an angle of more than 0.1 degree with respect to a plane perpendicular to a propagation direction of the optical signals, said at least one Bragg grating serving to perform both mode conversion and reflection of the optical signals propagating within said second dual mode optical waveguide portion at drop wavelength $\lambda_i$ and add wavelength $\lambda_j$, wherein said first and second portions of the dual mode optical waveguide are provided integrally without any splice, wherein the fundamental mode of said first optical waveguide and the higher-order mode of said dual mode optical waveguide have a same propagation constant, and wherein said mode discriminating directional coupler utilizes coupling of one or more evanescent electric fields.

2. The optical signal add-drop wavelength filter of claim 1, wherein said first optical waveguide and said first and second dual mode optical waveguides are comprised of optical fibers or integrated optics waveguides.

3. The optical signal add-drop wavelength filter of claim 1, wherein said mode discriminating directional coupler is a fiber-optic directional coupler.

4. The optical signal add-drop wavelength filter of claim 1, wherein the fundamental mode of said dual mode optical waveguide is LP01 mode, and the higher-order mode thereof is LP11 mode.

5. The optical signal add-drop wavelength filter of claim 1, wherein said dual mode optical waveguide is an elliptic core optical fiber so that the energy distribution of the higher-order mode does not change within said dual mode optical waveguide while optical signals propagate.

6. The optical signal add-drop wavelength filter of claim 4, wherein the tilted direction of said Bragg grating is the lobe direction of LP11 mode determined in said mode discriminating directional coupler.

7. The optical signal add-drop wavelength filter of claim 1, wherein the tilted angle of said Bragg gratings is preferably selected to be one of either an angle in which a the fundamental mode to the fundamental mode reflection does not occur within said dual mode optical waveguide, or an angle in which the higher-order mode to the higher-order mode reflection does not occur within said dual mode optical waveguide.

8. The optical signal add-drop wavelength filter of claim 1, further comprising a mode converter which performs mode conversion between the fundamental mode and higher-order mode of said dual mode optical waveguides.

9. The optical signal add-drop wavelength filter of claim 1, wherein a single mode optical waveguide is further connected in series to at least one of said first and second dual mode optical waveguides.

10. The optical signal add-drop wavelength filter of claim 1, wherein an optical amplifier for amplifying input/output optical signals is connected in series to at least one of said first optical waveguide and said first dual mode optical waveguide.

11. An optical signal add-drop wavelength filter for separating and simultaneously adding at least one wavelength signal from and to input optical signals consisting of multiple wavelengths of $\lambda_i, \ldots,$ and $\lambda_n$(n is a positive integer more than 1), said wavelength filter comprising:

a first dual mode optical waveguide portion and a first optical waveguide in which input of the multiple wavelength optical signals and output of optical signals which experienced wavelength drop are performed in a mutually exchanging manner;

a first mode discriminating directional coupler which causes energy transfer to occur at least 50% between a fundamental mode of said first optical waveguide and a higher-order mode of said first dual mode optical waveguide portion and also enables the fundamental mode of said first dual mode optical waveguide portion to propagate without change;

a second dual mode optical waveguide portion and a second optical waveguide in which input of optical signals to be added and output of optical signals which experienced wavelength add/drop are performed in a mutually exchanging manner;

a second mode discriminating directional coupler which causes energy transfer to occur at least 50% between a fundamental mode of said second optical waveguide and a higher-order mode of said second dual mode optical waveguide portion and also enables the fundamental mode of said second dual mode optical waveguide portion to propagate without change;

a third dual mode optical waveguide portion for propagating optical signals which passed through said first and second mode discriminating directional couplers; and an arrangement of Bragg gratings written within said third dual mode optical waveguide portion, in which at least one Bragg grating is connected in series which is tilted with an angle of more than 0.1 degree with respect to a plane perpendicular to the propagation direction of the optical signals, said Bragg grating serving to perform both mode conversion and reflection of the optical signals propagating within said third dual mode optical waveguide portion, wherein said first, second and third dual mode optical waveguide portions are provided integrally without any splices, and wherein a same propagation constant by at least one of:
  a) the fundamental mode of said first optical waveguide and the higher-order mode of said first dual mode optical waveguide portion, and
  b) the fundamental mode of said second optical waveguide and the higher-order mode of said second dual mode optical waveguide portion, and wherein at least one of said mode discriminating directional coupler utilizes coupling of one or more evanescent electric fields.

* * * * *